Feb. 18, 1941.　　　W. P. OVERBECK　　　2,231,943
POWER FACTOR MEASURING SYSTEM
Filed Feb. 23, 1938
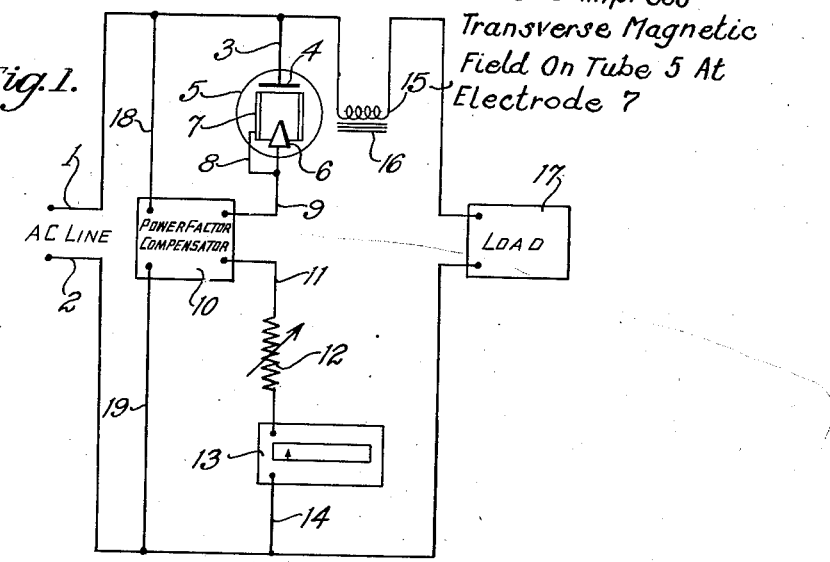
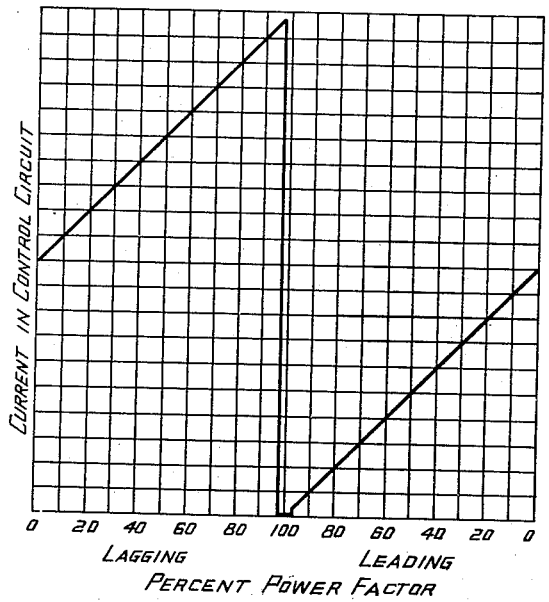
Inventor
WILCOX P. OVERBECK
by Elmer J. Gorn
Attorney Patented Feb. 18, 1941

2,231,943

UNITED STATES PATENT OFFICE 2,231,943

POWER FACTOR MEASURING SYSTEM

Wilcox P. Overbeck, Waltham, Mass., assignor to Raytheon Manufacturing Company, Newton, Mass., a corporation of Delaware Application February 22, 1938, Serial No. 192,040

7 Claims. (Cl. 172—245)

This invention relates to a system for measuring power factor.

One of the objects of this invention is to devise a simple circuit for measuring power factor.

Another object is to devise such a circuit in which the value of current flowing varies linearly with the percent power factor.

A further object is to devise such a circuit in which the current which flows is of sufficient intensity to operate power factor corrective devices, or other control or indicating devices directly.

A still further object is to accomplish the foregoing by the use of a magnetically-controlled electrical gaseous discharge tube.

The foregoing and other objects of my invention will be best understood from the following description of an exemplification thereof, reference being had to the accompanying drawing, wherein:

Fig. 1 is a diagrammatic circuit illustrating one embodiment of my invention; and Fig. 2 is a chart showing the manner in which current in the circuit of Fig. 1 varies with the percent power factor.

In Fig. 1 there are shown two conductors 1 and 2 which are adapted to be connected to a suitable source of alternating current. A conductor 3 extends from the conductor 1 to an anode 4 of an electrical space discharge tube 5. The tube 5 is preferably of the magnetically-controlled type, as more fully described and claimed in the co-pending application of Percy L. Spencer, Serial No. 612,235, filed May 19, 1932, for an improvement in Electrical gaseous discharge devices, now Patent No. 2,124,682, dated July 26, 1938. The tube is provided with a cathode 6 which is preferably of the indirectly-heated thermionic type, and with an intermediate electrode 7 consisting of non-magnetic electrically-conducting material adjacent the discharge path between the cathode 6 and the anode 4. The tube is filled with a suitable ionizing gas or vapor, preferably argon, at a pressure of the order of a millimeter or less, or mercury vapor at a pressure of the order of 1 to 100 microns. In any event the gas pressure is of a suitable value so that when a discharge occurs between the cathode and anode, the gas or vapor becomes ionized and current flows at a relatively low voltage drop. The intermediate electrode 7 is connected to the cathode 6 by means of a conductor 8, although various bias potentials may be impressed upon said intermediate electrode if so desired. The cathode 6 of the tube 5 is connected by means of a conductor 9 to one input terminal of a power factor compensating device 10. The other input terminal of the power factor compensating device 10 is connected by means of a conductor 11 through an adjustable resistance 12 to one terminal of a current meter 13. The other terminal of the current meter is connected by means of a conductor 14 to the line conductor 2. From the foregoing it will be seen that the tube 5 is connected in series with the power factor compensating device 10 and the current meter 13 directly across the A. C. line conductors 1 and 2. Thus both the compensating device 10 and the current meter 13 are responsive to the value of current which flows through the tube 5.

In order to make the current flowing through the tube 5 responsive to the percent power factor, a control coil 15 wound upon a core 16 is provided adjacent the tube 5. The core 16 is so disposed as to impress a transverse magnetic field intercepting the discharge path between the cathode 6 and the anode 4 within the tube 5 when the coil 15 is supplied with current. In absence of a magnetic field with an alternating voltage applied to the tube, conduction starts substantially at the time when the anode becomes positive and stops when the anode voltage drops substantially to zero. Since the tube does not conduct during the time that the cathode is positive, the tube rectifies the alternating voltage. As indicated in said co-pending application, now Patent No. 2,124,682, of Percy L. Spencer, when a transverse magnetic field is set up in the discharge path of such a tube and the anode thereof is made positive, initiation of the discharge is prevented until the magnetic flux drops to a predetermined minimum value, which for most purposes may be considered as zero. The coil 15 is made responsive to the current drawn by the load, and for this reason is connected in series in the line 1, which in turn is connected to one of the input terminals to the load 17. The line 2 is connected to the other input terminal to the load 17. In the presence of the magnetic control, the tube 5 still conducts current in only one direction, and therefore acts as a rectifier.

When a current, for example of a predetermined lagging power factor is drawn by the load 17, the current through the coil 15 will be at an appreciable value when the voltage between the lines 1 and 2 passes through zero, and this current remains at an appreciable value for a definite length of time after the anode 4 becomes positive. This length of time, of course, is the measure of the power factor. Since a discharge will not be initiated through the tube 5 until the field generated by the coil 15 falls to zero, the starting of the current through the tube 5 will be delayed until the current in the coil 15 has fallen to zero. The greater the angle of lag of the load current, the greater will be the delay in the initiation of the discharge through the tube 5. The average current which passes through the tube 5 decreases as the delay in the initiation of the discharge is increased, and thus as the lagging percent power factor of the load 17 becomes smaller, the current through the tube 5 will become smaller. If, however, the load 17 draws a leading power factor, the current through the coil 15 will not fall to zero until late in the positive half cycle of the voltage applied to the anode 4. Thus a slightly leading current will cause a small value of current to flow through the tube 5. As, however, the angle of lead becomes greater, the current through the coil 15 will pass through zero earlier in the positive half cycle applied to the anode 4, and the current through the tube 5 will increase. In Fig. 2 I have plotted the variations in current through the tube 5 against the percent power factor. It will be noted that the current bears a linear relation to the percent power factor, and as the power factor passes through unity, the current through the tube 5 suddenly shifts from a maximum to zero, or vice versa, depending upon the direction in the shift of the power factor. It will further be noted that there is a short space on either side of unity power factor, in which the current remains zero. This is due to the fact that any tube, such as 5, does not actually start at the instant the anode becomes positive, but waits until the anode reaches a predetermined starting voltage. Although in practice some slight deviation from the linear relationship which I have indicated occurs, yet for all practical purposes, the variation can be considered as linear.

In view of the above operation of my system, it will be noted that the current-responsive meter 13 can be calibrated to read percent power factor directly. Since the current varies linearly with the percent power factor, it is very easy to calibrate the meter 13 inasmuch as the scale thereon may be made linear. The resistance 12 is provided for the purpose of limiting the amount of current which flows through tube 5. Furthermore, by making the resistance 12 adjustable, the reading of the meter 13 can be adjusted for any conditions of operation. When my power factor indicating device is connected to any system, a load of predetermined power factor, preferably a condenser, is connected as the load 17, and the resistance 12 is varied until the power factor meter reads zero power factor. Thereafter the readings of the meter 13 will indicate accurately the power factor of any load which may be connected to the system.

Since the current which flows through the tube 5 is limited only by the capabilities of the tube to conduct current, it will be seen that large amounts of current may be passed and controlled by the tube 5. In order to increase the amount of current or power, it is merely necessary to decrease the value of the resistance 12. Since this large amount of power is available, it can be utilized directly to operate any suitable power factor compensating device such as I have indicated at 10. The compensating device 10 may be, for example, a series of condensers which are simply switched in and out of the circuit in accordance with the current flowing through the tube 5. The power factor compensating elements within the device 10 may therefore be connected through the lines 1 and 2 by means of the conductors 18 and 19, respectively. Of course any other type of power factor compensating device may be incorporated in the device 10.

Of course it is to be understood that my invention is not to be limited to the particular details of the foregoing arrangement inasmuch as many equivalents will suggest themselves to those skilled in the art. It will be noted that the broad aspect of my invention includes impressing an alternating voltage across the rectifier tube and delaying the firing of that tube in accordance with the phase displacement between the load current and the load voltage. In this broad aspect, therefore, the voltage impressed across the tube 5 may be of any frequency, although in most instances the frequency will be that of the supply voltage. Although it is preferred that the voltage impressed across the tube be in phase with the applied voltage, a voltage displaced by a definite phase angle from the line voltage may likewise be applied. In the same way, although the magnetomotive force which creates the transverse magnetic field is preferably in phase with the load current, yet this magnetomotive force likewise may be displaced by a definite phase angle with respect to the load current. It will be seen that if such definite phase angle displacements exist, the current flowing through the control tube will likewise be a definite measure of the percent power factor of the load. In so far as other specific equivalents are concerned, instead of utilizing a magnetically-controlled tube, any other type of control tube in which the control is responsive to the load current may be used. Various other equivalents will suggest themselves to those skilled in this art. It is accordingly desired that the appended claims be given a broad interpretation commensurate with the scope of the invention within the art.

What is claimed is:

1. In combination, an alternating current load system adapted to be supplied with current from a source of alternating current, a controlled electrical space discharge rectifier, means for impressing a voltage in predetermined phase relation to the voltage of said source across said rectifier, and means responsive to the current flowing in said load system for delaying the initiation of a discharge in said rectifier beyond the normal firing time in accordance with the phase displacement between said current and the voltage of said source, whereby the value of the current flowing through said rectifier is a measure of the power factor of said load system.

2. In combination, an alternating current load system adapted to be supplied with current from a source of alternating current, a controlled electrical space discharge rectifier, means for impressing a voltage in predetermined phase relation to the voltage of said source across said rectifier, magnetic means for creating a magnetic flux for delaying the initiation of a discharge in said rectifier beyond the normal firing time, and means for energizing said magnetic means in accordance with the current flowing in said load system, whereby the value of the current flowing through said rectifier is a measure of the power factor of said load system.

3. In combination, an alternating current load system adapted to be supplied with current from a source of alternating current, a controlled electrical space discharge rectifier, means for impressing a voltage in predetermined phase relation to the voltage of said source across said rectifier, an impedance element in series with said rectifier for limiting the flow of current through said rectifier, and means responsive to the current flowing in said load system for delaying the initiation of a discharge in said rectifier beyond the normal firing time in accordance with the phase displacement between said current and the voltage of said source.

4. In combination, an alternating current load system adapted to be supplied with current from a source of alternating current, a controlled electrical space discharge rectifier, means for impressing a voltage in predetermined phase relation to the voltage of said source across said rectifier, an impedance element in series with said rectifier for limiting the flow of current through said rectifier, means for adjusting the value of said impedance, and means responsive to the current flowing in said load system for delaying the initiation of a discharge in said rectifier beyond the normal firing time in accordance with the phase displacement between said current and the voltage of said source.

5. In combination, an alternating current load system adapted to be supplied with current from a source of alternating current, a controlled electrical space discharge rectifier, means for impressing a voltage in predetermined phase relation to the voltage of said source across said rectifier, means responsive to the current flowing in said load system for delaying the initiation of a discharge in said rectifier beyond the normal firing time in accordance with the phase displacement between said current and the voltage of said source, and power factor compensating means responsive to the current flowing through said rectifier.

6. In combination, an alternating current load system adapted to be supplied with current from a source of alternating current, a controlled electrical space discharge rectifier, means for impressing a voltage in predetermined phase relation to the voltage of said source across said rectifier, said rectifier comprising an envelope containing a cathode, an anode, and an ionizable medium, magnetic means for creating a magnetic flux in the discharge path between said cathode and anode for delaying the initiation of a discharge in said rectifier beyond the normal firing time, and means for energizing said magnetic means in accordance with the current flowing in said load system, whereby the value of the current flowing through said rectifier is a measure of the power factor of said load system.

7. In combination, an alternating current load system adapted to be supplied with current from a source of alternating current, a controlled electrical space discharge rectifier, means for impressing a voltage in predetermined phase relation to the voltage of said source across said rectifier, said rectifier comprising an envelope containing a cathode, an anode, and an ionizable medium, magnetic means for creating a magnetic flux transverse to the discharge path between said cathode and anode for delaying the initiation of a discharge in said rectifier beyond the normal firing time, and means for energizing said magnetic means in accordance with the current flowing in said load system, whereby the value of the current flowing through said rectifier is a measure of the power factor of said load system.

WILCOX P. OVERBECK.